Nov. 10, 1970 H. LINSTEDT 3,539,907
INTEGRATED CIRCUIT VOLTAGE REGULATING ARRANGEMENT
Filed Sept. 11, 1968
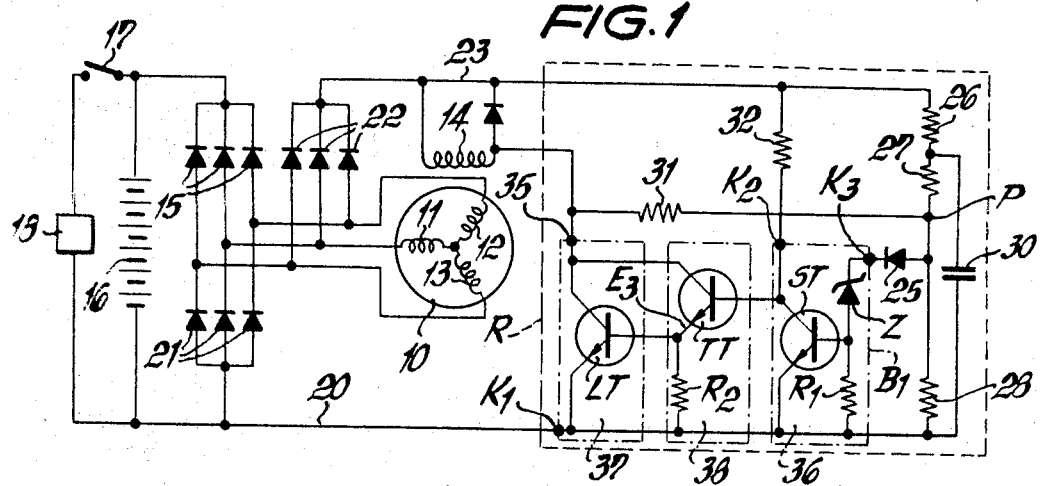
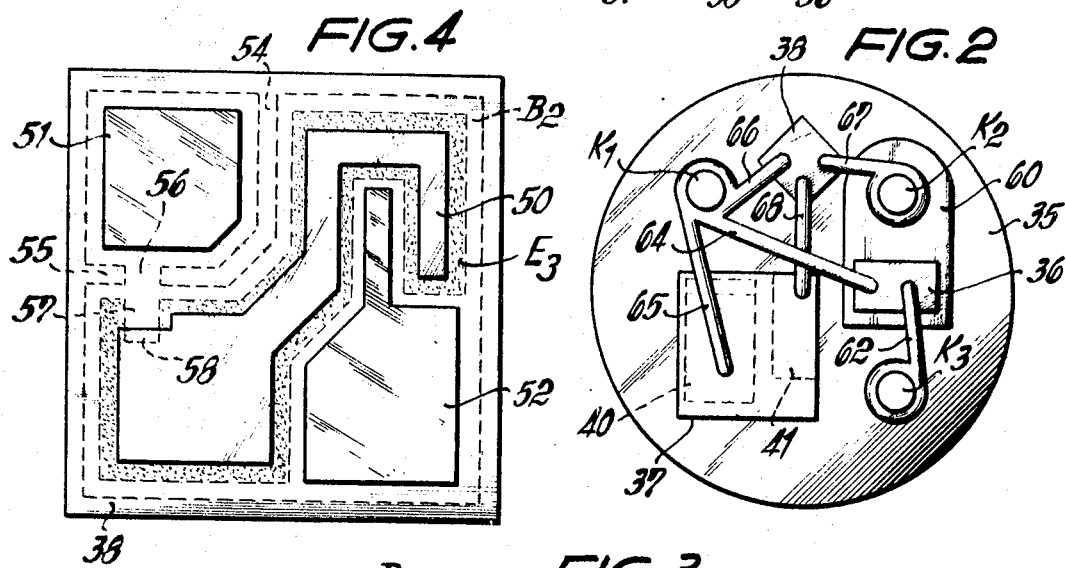
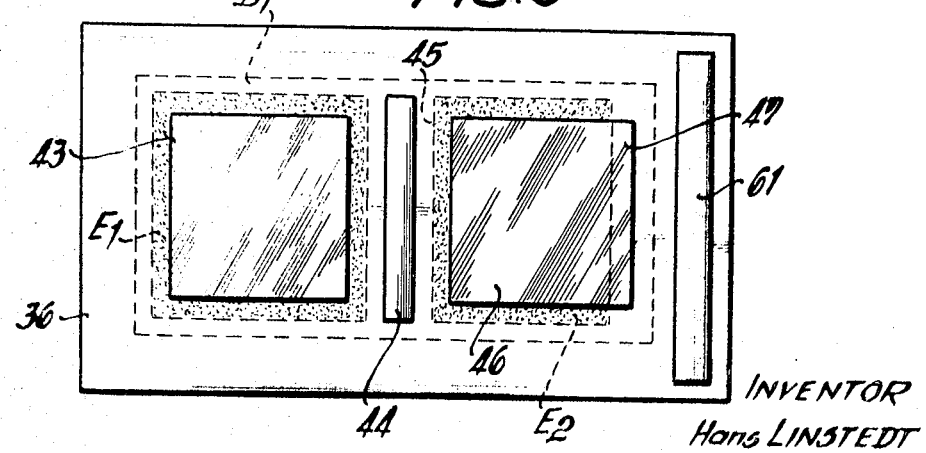
INVENTOR
Hans LINSTEDT
BY
Michael S. Shuker
his ATTORNEY _3,539,907_
_Patented Nov. 10, 1970_

3,539,907
INTEGRATED CIRCUIT VOLTAGE REGULATING ARRANGEMENT
Hans Linstedt, Stuttgart, Germany, assignor to Robert Bosch GmbH, Stuttgart, Germany
Filed Sept. 11, 1968, Ser. No. 759,160
Claims priority, application Germany, Sept. 12, 1967, 1,588,072
Int. Cl. H02p 9/30
U.S. Cl. 322—28                                    7 Claims

ABSTRACT OF THE DISCLOSURE

The field winding of the voltage generator to be regulated, is connected in series with the emitter-collector path of a power transistor. A control transistor controls the operating state of the power transistor. The reference voltage source is provided by a Zener diode connected between the generator and the control transistor. The control transistor, diode and resistor connected between the emitter and base of the control transistor, are within one semiconducting chip. The power transistor is contained within a separate semiconducting chip.

BACKGROUND OF THE INVENTION

The present invention relates to a voltage regulator for generators driven at highly varying speeds, as may be encountered in lighting machines for motor vehicles. A power transistor is connected to the field winding of the generator through its emitter-collector path which is connected in series with the winding. A control transistor controls the state of the power transistor. The base of the control transistor is connected to the output terminal of the generator by way of a voltage reference source in the form of a Zener diode. The base of this control transistor may also be, on the other hand, connected to a voltage source which is proportional to the voltage output of the generator. A resistor bridges the emitter-base path of the control transistor.

In the conventional regulators of the preceding species, the power transistor operates in the on-off basis and remains in the conducting state until the voltage to be regulated attains its desired value. The Zener diode associated with this desired or reference value then becomes fully conducting and, thereby, also causes the control transistor to be in the fully conducting state. As a result, the power transistor becomes cut off. In order to perform the switching of the power transistor within the least possible time interval, a feed-back circuit is provided between the field winding of the generator and the base electrode of the control transistor. The collector of the power transistor is connected to the field winding of the generator. At the same time, the feed-back circuit may be, alternately, connected to the electrode of the Zener diode leading to the base of the control transistor. Such rapid switching of the power transistor is desirable in order to avoid thermal loading effects of the power transistor. In the arrangements known in the art, the individual circuit components associated with the regulator are interconnected through power stages. These power stages are mounted upon a printed circuit board, the base material of which is made of insulating substance. Although considerable savings in space have been attained through such arrangement in relation to voltage regulators, which operate in conjunction with electromagetic relays, it is desirable to realize still further savings in space to the extent that the voltage regulator may be directly mounted within the generator. Through such design considerable simplification in construction is realized in the use of, for example, lighting machines path of the power transistor. The driving transistor is for motor vehicles. In such a case the generator may be connected to the battery, used for the ignition of the vehicle, with a single connection. As a result, the connecting terminals and conductors provided heretofore within the motor vehicle, may be avoided.

A voltage regulator with particularly small space requirements and good heat transfer characteristics is realized when, in accordance with the present invention, the control transistor, the Zener diode and the resistor connected in parallel with the emitter-base path of the control transistor, are all mounted upon a common semiconducting chip. This is particularly the case of a silicon chip processed through the planar technology. This semiconducting chip is mounted upon a metallic socket plate together with the semiconducting member containing the power transistor. In order to produce the necessary connecting terminals in this design, it is required to provide a first contact terminal for the electrode of the Zener diode opposite to the base of the control transistor. A second contact terminal is required for the connection of a resistor to the collector of the control transistor. A third contact terminal is required for the connection of the emitter of the control transistor and the power transistor. The connection of the field winding of the generator may be accomplished through the metallic socket plate. The collector electrode of the power transistor contained in the semiconducting member mounted on the socket plate, is soldered to the latter. The construction of this design, in accordance with the present invention, is achieved in a particularly simple manner through the provision of three conducting terminals which are inserted into the socket plate and insulated therefrom. These three terminals are mounted on the plate such that they form an equal-sided right triangle in which the terminals or contacts are the vertices of the triangle.

In a preferred embodiment, a semiconducting chip is provided for the control transistor, the Zener diode, and the resistor connected between the emitter and base of the control transistor. This semiconducting chip is made of silicon, preferably n-type of silicon, at the back side where the collector terminal of the control transistor is. A base zone for the Zener diode and the control transistor is diffused into the silicon. Within this base zone, two emitter zones are diffused so that they are separated from each other. A voltage potential bar or conductor is provided between the two emitter zones and in contact with the base zone. Within the first emitter zone associated with the Zener diode, a first metallized contact is provided. A second metallized contact is provided for the second emitter zone associated with the control transistor. The second metallized contact reaches to the second emitter zone through the voltage potential bar at one edge, and thereby has direct contact with the base zone for the purpose of forming the resistor.

A particularly simple conductor connection may be realized in a further embodiment of the present invention, through soldering the ends of the connecting wires to the metallized contacts of the semiconducting chip. The other ends of the wires are formed in the shape of a helix of a plurality of turns, and are placed onto one of two contact terminals. The third contact terminal carries a pre-leaded strip placed over the terminal through a hole. The metallization for forming the collector terminal of the control transistor is soldered to the back side of the semiconducting chip.

The above design is of particular advantage when a driving stage is provided before the power transistor for the purpose of increasing the regulating precision within the regulator, and to reduce thermal losses. The driving stage consists of a driving transistor which has its emitter-collector path connected in parallel with the base-collector connected to the power transistor through a resistor connected to the emitter of the driving transistor and parallel to the emitter-base path of the power transistor. In this case the driving transistor can, in accordance with further designs of the present invention, be provided with its resistors on a third semiconducting chip which is also preferably produced through planar processes. The collector of the driving transistor as well as that of the power transistor are directly soldered to the socket plate at the back side of the semiconducting chip. In this manner, the required connection between the collector of the power transistor and the collector of the driving transistor is achieved directly through the socket plate. Further improvements in design which affect the geometric form of the emitter and base zone of the driving transistor and the formation of the resistor, may be seen from the disclosed embodiment in which a fully transistorized voltage regulator is described.

SUMMARY OF THE INVENTION

A voltage regulating arrangement for regulating the voltage of generators which are driven at particularly varying speeds such as prevail in motor vehicles. The field winding of the generator is connected in series with the emitter-collector path of a power transistor. The conducting state of the power transistor is controlled by a control transistor with base electrode connected to a Zener diode which serves as a reference voltage source. The Zener diode is also connected to the output terminal of the generator. A bridging resistor is connected across the emitter-base path of the control transistor. The control transistor, Zener diode and bridging resistor are formed in a semiconducting chip made of silicon. Another semiconducting chip is used for the purpose of forming the power transistor. The two semiconducting chips are mounted upon a plate which secures the chips in place and provides a base for all of the interconnections between the components.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an electrical schematic diagram of the voltage regulator, in accordance with the present invention when connected to an A.C. lighting machine in a motor vehicle;

FIG. 2 is a top view of the plate containing all of the active components of the voltage regulator shown in FIG. 1;

FIG. 3 is a plan view of a semiconducting chip which contains the control transistor, the Zener diode, and the emitter-base resistor for the control transistor of the voltage regulator of FIG. 1; and FIG. 4 is a plan view of the driving transistor together with its operating resistor, as contained within a third semiconducting chip, in accordance with the present invention.

DESCRIPTION OF THE PREFERRED EMBODIMENTS

Referring to the drawing, the voltage regulator is intended for the operation of the lighting A.C. generator 10 shown schematically in the drawing. This generator has three stationary A.C. windings 11, 12 and 13, and a rotating field winding 14 mounted upon the armature of the lighting machine. The generator 10 is driven by a motor within a motor vehicle, not shown, through a belt and pulley transmission arrangement, also not shown. Each of the A.C. windings in the generator is connected to a diode 15 leading to a battery 16 used for the purpose of starting and operating the engine of the motor vehicle. This battery may be a conventional 12.6 volt type. A switch 17 is connected between the battery 16 and the battery load represented by the component 18, which may be the ignition arrangement or the driving lights of the vehicle, for example. The three windings of the generator 10 are also connected to three diodes 21 leading to the negative terminal 20 of the battery 16. The three A.C. windings 11, 12 and 13 are, furthermore, connected, by way of the diodes 22 to the field winding or excitation winding 14. The field winding 14 also leads to the voltage regulator R outlined in the drawing of FIG. 1 by dashed lines. The voltage regulator connected to the field winding 14 establishes that the excitation current be a function of the time average of the driving speed and the load of the lighting generator. The positive terminal 23 leading to the regulator R has a potential applied to it through the diodes 22 such that the voltage difference between the positive terminal 23 and the negative terminal 20 is proportional to the charging voltage for the battery 16 provided through diodes 15 and 21. As a result of the regulator R, the charging voltage is maintained independent of the operating speed and load of the lighting machine, at approximately 14 volts.

The regulator R includes active components of which one is the power transistor LP. The emitter-collector path of this resistor is connected to the field winding 14. A driving transistor TT is connected to the power transistor LT and the field winding 14. A control transistor ST is connected to the driving transistor TT, and a Zener diode Z is connected to the base of the control transistor ST. The Zener diode Z serves the purpose of providing the desired reference value or parameter, and is connected in series with a silicon diode 25 to compensate the Zener diode for temperature variations. The diode 25 is, in turn, connected to a junction P which is a voltage tap of a voltage divider comprised of three resistors 26, 27 and 28. A smoothing capacitor 30 of approximately 0.3 µf. is connected between the negative terminal 20 and the junction between the resistors 26 and 27. A feed-back resistor 31 of approximately 40 kohm is connected between the field winding 14 and the voltage tap P between the resistors 27 and 28. A resistor 32 of approximately 900 ohms is connected between the positive terminal or positive conducting path 23 and the collector of the control transistor ST. The resistor 32 together with the resistors 26, 27 and 28, as well as the feed-back resistor 31 can be arranged, in the conventional manner, in the form of a printed circuit.

In order that the lighting machine or lighting generator 10 be self-exciting upon commencing operation from a stationary position, it is essential that the power transistor LT and the driving transistor TT are both in the conducting state, while the control transistor is substantially cut off. A resistor R1 of approximately 600 ohms is provided or connected in parallel with the emitter-base path of the control transistor ST. Connected in parallel with the emitter-base path of the power transistor LT, is a resistor R2 of approximately 150 ohms. This resistor R2 assures that the power transistor and the driving transistor are both simultaneously cut off when the voltage between the terminals 20 and 23 have attained their desired value. At this time the control transistor is made conducting as a result of the Zener diode Z.

The inactive components as shown in the schematic diagram of FIG. 1, in accordance with the present invention, may be realized through means of printed circuitry which is connected to the diode 25 and the capacitor 30. The active components may be included in a second group for which a metallic socket plate 35 is provided. FIG. 2 is a plan view of this socket plate magnified seven times. The actual diameter of the socket plate 35 is approximately 11 millimeters. The individual active components are located on three thin semiconducting silicon disks 36, 37 and 38. These disks are in the form of chips.

The first semiconducting disk 36 includes the control transistor ST, the Zener diode Z, and the base resistor R1 of the control transistor. The internal construction of this semiconducting disk 36 is shown in FIG. 3 which is a top view of this disk or chip, magnified approximately 65 times. The second semiconducting disk 37 is in the form of a square in which an edge is approximately 4 millimeters in length. This second semiconducting disk 37 includes only the power transistor LT produced with conventional planar techniques. The construction has, however, the special feature that the collector terminal of the power transistor is soldered to the back side of the socket plate 35. As shown in FIG. 2, the front side of the socket plate 35 has a contact pad or metallic deposit 40 for the emitter terminal of the power transistor. At the same time, a similar contact pad 41 is provided for the base of the power transistor. The third semiconducting disk 38 is also square-shaped having, however, an edge length of only 1.6 millimeters. This third semiconducting disk or chip includes the driving transistor TT as well as the emitter-base resistor R2 for the power transistor LT.

In particular, the control transistor ST, the Zener diode Z, and the emitter-base resistor R1 included within the semiconducting chip 36, are made of n-conducting silicon. The construction is such that through the conventional planar techniques, a rectangular-shaped base zone B1 is produced. The process involves covering a border or edge zone with a photosensitive coating such as a photoresist, and diffusing with p-conductivity doping materials from a gas phase. Within this base zone, two substantially square emitter zones E1 and E2 are diffused. These two square emitter zones are separated from each other, and have n-type characteristics. The emitter E1 is associated with the Zener diode Z and must be connected, by way of the diode 25, to the voltage tap P, in accordance with the configuration of FIG. 1. A metallized contact pad 43, consisting of a lead-tin alloy combination, is applied to the emitter zone E1 for the purpose of connecting the emitter zone in a predetermined manner. The other electrode of the Zener diode is derived from the base zone B1. The latter is a p layer extending beneath the emitter of the control transistor ST, as reflected by the emitter zone E2. However, as shown by FIG. 1, the other electrode of the Zener diode does not require connection with any of the other semiconductor chips. Between the two emitter zones E1 and E2, a metallized voltage pad 44 lies on the p-type base zone B1. The voltage pad is provided solely for the purpose of assuring a predetermined base potential for the second emitter zone E2 associated with the control transistor ST.

The p-type base layer B1 is produced in the planar process through diffusion of boron from a gas phase. In the diagram of FIG. 3, the boron concentration is greatest at the upper side of the semiconducting chips. As a result, the Zener voltage from the Zener diode is determined at that location. The Zener diode is formed from the emitter E1 and the base layer B1. As may be seen from analytical calculations, the Zener current is derived exclusively from the edge of the emitter zone E1 neighboring the voltage pad 44. As a result of the length of the voltage pad 44, an optimum compromise is realized between the surface load of the zones associated with the Zener diode, and the increasing surface load due to decreasing Zener resistance.

For purposes of connecting to the emitter zone E2 of the control transistor ST, a metallized contact 46 is provided on this emitter zone. The contact 46 is made of lead-tin alloy similar to the contact 43. The metallized contact 46 extends through its edge zone 47, lying opposite to the voltage pad 44, over the emitter zone E2. The edge zone 47 extends over the base zone B1 which is maintained free of isolating materials. Through this construction, the emitter-base resistor R1 of the control transistor is obtained. This resistor R1 has its magnitude determined through the length of the current paths of the short-circuit zone 47 to the active emitter edge 45. These current paths extend beneath the emitter zone E2, through the p-type base layer B1 along the edge of the emitter zone E2.

The semiconductor chip 38 containing the driving transistor TT and the base resistor R2 for the power transistor, is shown in FIG. 4 magnified 50 times. The collector terminal of the driving transistor is soldered to the lower side of the socket plate 35, similar to the construction related to the semiconducting chip 37 containing the power transistor. The chip as shown in FIG. 4 contains a p-type base zone B2 the border of which is shown by the dashed lines. The base zone B2 reaches close to the edge of the semiconducting chip, and is formed through diffusion of boron into n-type silicon base material. The emitter of the driving transistor TT is formed by diffusing n-type emitter zone E3 into the base zone. The emitter zone E3 is beneath the metallic contact layer 50 which forms the emitter terminal and makes the emitter readily accessible. The edge of the emitter extending from the metallic contact 50 is shown in FIG. 4 in the form of a dotted area, for purposes of clarification. In this design, it is essential that the emitter zone E3 is essentially diagonally disposed in the field of the base zone B2. As a result, two metallized surfaces 51 and 52 are provided for the purpose of serving as base contacts. The zones beneath these contact surfaces, in the base B2, are considerably electrically isolated from each other. This isolation is increased through two narrow extensions 54 and 55 which are formed from the collector base material and diffusion into the base zone B2. Through these extensions 54 and 55, the width of the connecting zone of the base zone beneath the contact surface 51 is held to 100 $\mu$m. A free section 57 of the base zone adjoining the gap 56, leads to a small area 58, at which the metallized emitter 50 overlaps the base zone B2. An emitter-base short-circuit is established at this area 58. This short-circuit condition is, however, not of low resistance. In particular the base resistor R2 is formed from the path between the metallized emitter 50 and the metallized contact 51. The resistor R2 may be connected, by way of the metallized contact 51, with the emitter of the power transistor LT and, in addition, with the metallized emitter 50 arranged over the emitter zone E3. The connection of the base zone is accomplished through the metallized contact 52.

The local emitter-base short-circuit at the position 58 leads to an additional connection between the emitter and the base of the driving transistor TT. This connection leads entirely around the emitter E2 through the small base strip between emitter and collector at the upper side of the semiconducting chip. This connection, furthermore, leads through the thin base layer under the emitter. Through special selection and formation of the local emitter-base short-circuit in the corner of the emitter contact surface, these two paths may be made of high resistance with the aid of the above-mentioned base extensions 54 and 55. One path is made relatively long, as shown in the embodiment of the drawing. The other path is provided with narrow resistance so that only negligible amplifying losses are realized.

Two pn diodes result from the contact established through interaction of the base zone with the metallized contact 51 within the semiconducting chip. The diodes are in their cut-off state during the operation of the regulator. The first diode lies between this metallized contact and the base zone of the power transistor, whereas the second pn diode lies between the terminal 51 and the collector of the power transistor which is secured to the back side of the semiconducting chip. These two additional diodes are of particular significance or importance in the damping of the oscillations which may appear during the operation of the regulator. The diodes, furthermore, support in an advantageous manner, the capacitor 30 which is connected across a portion of the voltage divider comprised of resistors 26, 27 and 28. Aside from this the emitter paths of the power transistor and the driving transistor are protected from voltage spikes of reversed polarity.

It is desirable to secure all three semiconducting chips 36, 37 and 38 to the socket plate 35, during one passage through the tunnel-shaped furnace containing an inert gas atmosphere. At the same time, it is also desirable to form, during this passage through the furnace, the interconnections required between the individual semiconducting chips. In order to make these advantageous conditions possible, the socket plate is used as collector terminal for the power transistor LT and the driving transistor TT. Aside from this, connecting terminals K1, K2 and K3 are provided in the socket plate 35. These connecting terminals are in the form of posts and are secured to both sides of the socket plate by means of glass insulation. The connecting terminals K1, K2 and K3 lie at the vertices of an equal-sided right triangle. The design permits simplified assembly of the semiconducting chips with the aid of templates. On the extended level through the hypotenuse of the triangle, are two diagonal corners of the semiconducting chip 37 which contains the power transistor. Since the first semiconducting chip 36, which contains the control transistor ST, the Zener diode Z and the emitter resistor R1, carries the collector terminal on its back side, it must not be directly mounted upon the socket plate 35. For this purpose of mounting and securing, a foil 60 is provided. This foil 60 is leaded at its upper surface and moved over the connecting terminal K2 to through its securing hole, not shown. The semiconducting chip 38 is mounted upon this foil. An orienting pad or panel 61 is metallized upon the semiconducting disk or chip in order to assure that mounting takes place on the proper side.

The metallized contact 43 associated with the Zener diode can be connected to the terminal K3, which forms the connection for the Zener diode 25, in a simple manner. Through a thin silver wire 62, this connection between the terminal K3 and the metallized contact 43 may be accomplished. The silver wire 62 bears or presses against the metallized contact 43 at its free end, through its own elastic properties. At the other end of the wire, the latter is wound in a helix of several turns. The helical end of the wire can be placed upon the terminal K3 during assembly, and can be soldered in place by the placement of a ring of soldering metal. The metallized contact 46 connected to the emitter of the control transistor ST can be connected, in a similar manner, through one of the three connecting wires 64, 65 and 66 forming the three ends of a helical or wound shape inserted onto the terminal K1. The terminal K1 which forms the connection to the metallized contacts of the semiconductor chip 38 by way of the second of its terminal wires 66, also forms, at the same time, the entire terminal of the voltage regulator at the negative potential supply line 20. The connection to the base of the driving transistor TT, by way of the metallized base 52 on the third semiconducting chip 38, is achieved with the aid through the third connecting wire 67. The wound end of the latter is also inserted or placed onto the terminal K2. The remaining connection between the emitter E3 of the driving transistor and the base zone 41 of the power transistor in the semiconducting chip 37, results through the connecting wire 68. One end of the latter lies upon the base zone 41, whereas the other end lies on the metallized emitter 50 formed at the left lower corner of the semiconducting chip 38. While passing through the soldering furnace, the terminal wire 68 is held in place through jigs, not shown.

The particular advantage in the arrangement of the semiconducting chips 36, 37, 38 as shown in FIGS. 2-4, resides in the improved manufacturing reliability and the condition that little waste or scrap is incurred in the manufacture. Furthermore, through the soldered connections, as described above, the arrangement can withstand considerable vibration and shock which may be incurred in the operation of motor vehicles, as well as the mechanical and thermal effects that normally prevail in such operation.

In the disclosed embodiment, the power transistor LT is situated on one semiconducting chip 37, and the driving transistor TT is situated on a separate semiconducting chip 38. It is quite possible, however, to provide both of these transistors on a single semiconducting chip in the form of the conventional Darlington arrangement, without detracting from the basic principle of the present invention.

It will be understood that each of the elements described above, or two or more together, may also find a useful application in other types of voltage regulators differing from the types described above.

While the invention has been illustrated and described as embodied in a voltage regulator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A voltage regulating arrangement for a generator driven at varying speeds comprising, in combination, a power transistor with emitter-collector path connected in series with the field winding of said generator; a control transistor connected to said power transistor for controlling the state of said power transistor; diode means connected between the output terminal of said generator and the base of said control transistor for providing a reference voltage source; bridging resistor means connected across the emitter and base of said control transistor; first semiconducting chip means for containing said control transistor, diode means and resistor means; second semiconducting chip means for containing said power transistor; mounting plate means upon which said first and second semiconducting chips are securedly mounted; a base zone diffused into the back side of said first semiconducting chip means for providing a common base zone for said diode means and said control transistor, said first semiconducting chip means being of silicon; first and second emitter zones diffused into said base zone and separated from each other; metallic strip means in contact with said base zone and being between said two emitter zones, said metallic strip means forming a potential source means; first metallized contact means arranged within said first emitter zone, said first emitter zone being associated with said diode means; and second metallized contact means arranged on said second emitter zone, said second emitter zone being associated with said control transistor, said second metallic contact means extending over said second emitter zone and contacting said base zone for forming said bridging resistor means.

2. The voltage regulating arrangement as defined in claim 1 including three electrically isolated post-shaped terminals inserted into said plate means for providing connecting terminals, said plate means being the collector terminal of said power transistor.

3. The voltage regulating arrangement as defined in claim 2 including contact wires connected to said metallized contact means through solder at one end of said wires, the other ends of said wire being wound into loop formation and mounted on one of said post-shaped terminals, another one of said post-shaped terminals carrying a strip sheet through a hole, said strip sheet being pre-leaded; and collector terminal metallization means on the back side of said first semiconducting chip means for forming the collector terminal of said control transistor.

4. The voltage regulating arrangement as defined in claim 3 including means for mounting said post-shaped terminals on said plate means at the corners of an equal-sided right triangle, said second semiconducting chip means being substantially outside of said triangle and in proximity of the hypotenuse of said right triangle.

5. The voltage regulating arrangement as defined in claim 4 including a driving transistor with base connected to the collector of said control transistor, the emitter-collector path of said driving transistor being connected in parallel with the base-collector path of said power transistor; emitter resistor means connected in series with the emitter of said driving transistor, said emitter resistor means being connected in parallel with the emitter-base path of said power transistor; third semiconducting chip means for containing said driving transistor and said emitter resistor means; and solder means for securing said third semiconducting chip means to said plate means together with said first and said second semiconducting chip means.

6. The voltage regulating arrangement as defined in claim 5 including a second base zone diffused into the upper side of said third semiconducting chip means, the back side of said third semiconducting chip means forming the collector terminal of said driving transistor, said base zone being substantially square-shaped; connecting terminal means on said base zone and in one corner of said base zone; and a narrow undiffused section in said third semiconducting chip means and surrounding said terminal contact means on said second base zone to a short gap.

7. The voltage regulating arrangement as defined in claim 6 including an undiffused zone section extending from said gap.

References Cited

UNITED STATES PATENTS

| | | |
|---|---|---|
| 3,256,587 | 6/1966 | Hangstefer. |
| 3,273,049 | 9/1966 | Shano _____ 322—28 |
| 3,379,937 | 4/1968 | Shepherd. |

ORIS L. RADER, Primary Examiner

H. HUBERFELD, Assistant Examiner

U.S. Cl. X.R.

307—303; 317—101; 322—73